US005802514A

United States Patent [19]
Huber

[11] Patent Number: 5,802,514
[45] Date of Patent: Sep. 1, 1998

[54] AUTOMATED CLIENT/SERVER DEVELOPMENT TOOL USING DRAG-AND-DROP METAPHOR

[75] Inventor: Val J. Huber, Berkeley, Calif.

[73] Assignee: Vision Software Tools, Inc., Oakland, Calif.

[21] Appl. No.: 630,020

[22] Filed: Apr. 9, 1996

[51] Int. Cl.⁶ .................................................. G06F 17/30
[52] U.S. Cl. .................. 707/4; 707/1; 707/2; 707/10;
707/101; 707/102; 707/203; 707/505; 707/506;
707/507; 707/508; 395/701; 345/348
[58] Field of Search ..................... 395/619, 612,
395/701; 707/203, 101, 10, 1, 100, 4, 2,
102, 508, 507, 506, 505; 345/348

[56] References Cited

U.S. PATENT DOCUMENTS

| | | | |
|---|---|---|---|
| 4,315,315 | 2/1982 | Kossiakoff | 364/300 |
| 4,455,619 | 6/1984 | Masui et al. | 364/900 |
| 4,742,467 | 5/1988 | Messerich et al. | 364/200 |
| 4,791,561 | 12/1988 | Huber | 364/300 |
| 4,860,240 | 8/1989 | Gendron et al. | 364/300 |
| 4,939,689 | 7/1990 | Davis et al. | 364/900 |
| 5,187,788 | 2/1993 | Marmelstein | 395/700 |
| 5,237,691 | 8/1993 | Robinson et al. | 395/700 |
| 5,249,300 | 9/1993 | Bachman et al. | 395/800 |
| 5,261,037 | 11/1993 | Tse et al. | 395/76 |
| 5,287,449 | 2/1994 | Kojima | 395/161 |
| 5,293,615 | 3/1994 | Amada | 395/600 |
| 5,295,222 | 3/1994 | Wadhwa et al. | 395/1 |
| 5,301,313 | 4/1994 | Terada et al. | 395/600 |
| 5,353,401 | 10/1994 | Izawa et al. | 395/161 |
| 5,355,493 | 10/1994 | Silberbauer et al. | 395/700 |
| 5,381,548 | 1/1995 | Matsuo | 395/700 |
| 5,386,508 | 1/1995 | Itonori et al. | 395/161 |
| 5,386,556 | 1/1995 | Hedin et al. | 395/600 |
| 5,421,008 | 5/1995 | Banning et al. | 395/600 |
| 5,428,776 | 6/1995 | Rothfield | 395/600 |
| 5,430,836 | 7/1995 | Wolf et al. | 395/155 |
| 5,566,330 | 10/1996 | Sheffield | 395/600 |
| 5,574,908 | 11/1996 | Harding et al. | 395/601 |
| 5,590,322 | 12/1996 | Harding et al. | 395/604 |
| 5,592,668 | 1/1997 | Harding et al. | 395/602 |
| 5,598,524 | 1/1997 | Johnston et al. | 395/348 |
| 5,611,076 | 3/1997 | Durflinger et al. | 395/613 |
| 5,634,054 | 5/1997 | Sarachan | 395/611 |

OTHER PUBLICATIONS

Jeffrey M. Richter, Windows 3.1: A developper's Guide, 2nd Eddition, M&TBooks, A Division of M&T Publishing, Inc, pp. 541–577, Jan. 1992.

Jeffrey Richter "Drop Everything: How to make your application accept and source Drag and Drop files," Microsoft systems journal, vol.7, No.3, pp. 19–30, Jun. 1992.

*Primary Examiner*—Thomas G. Black
*Assistant Examiner*—Jean M. Corrielus
*Attorney, Agent, or Firm*—Burns, Doane, Swecker, and Mathis LLP

[57] ABSTRACT

A tool for the development of multiple-table database applications for client/server environments automates both capture of system requirements and code production. A client portion of a multiple-table, client/server database application for processing requests against a server database, is developed by first storing in a repository a description of the server database describing database entities within the server database and relationships between those database entities. Representations of the database entities are displayed, and an application drawing window is provided. The user drags and drops within the application drawing window one of said representations that represents a particular database entity. The tool then creates within the repository an entry for the particular database entity, and draws within the drawing window a representation of the particular database entity. For each database entity for which an entry within the repository has been created, the tool checks the description of the server database stored in the repository to determine whether a relationship exists between the particular database entity and the database entity being checked. If a relationship does exist between the particular database entity and the database entity being checked, the tool then creates within the repository an entry for that relationship, and draws within the drawing window a connector representing that relationship. The foregoing drag-and-drop sequence is repeated multiple times. When the design is complete, the tool, using information stored in the repository, automatically generates the client portion of the multiple-table, client/server database application.

11 Claims, 9 Drawing Sheets

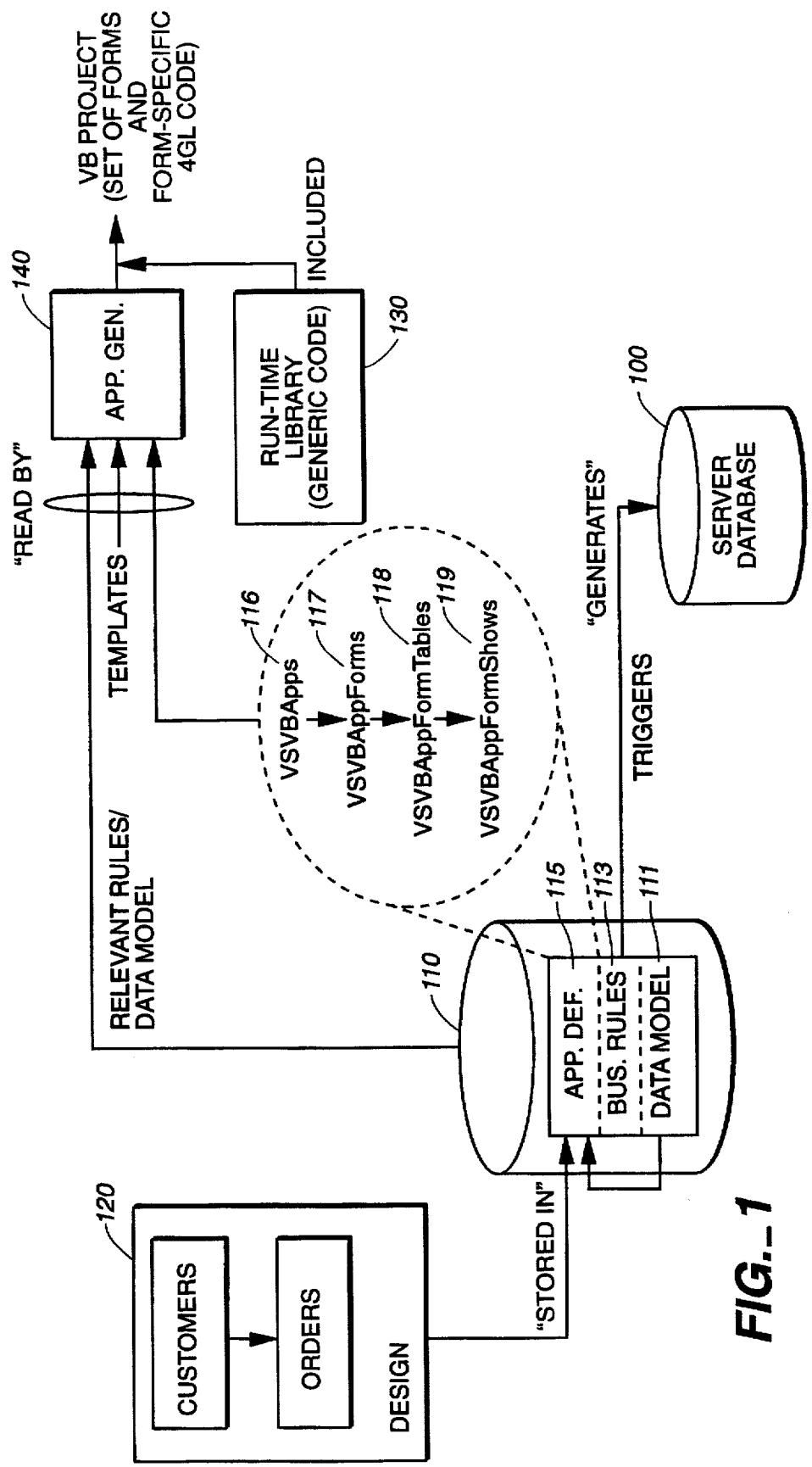
FIG._1

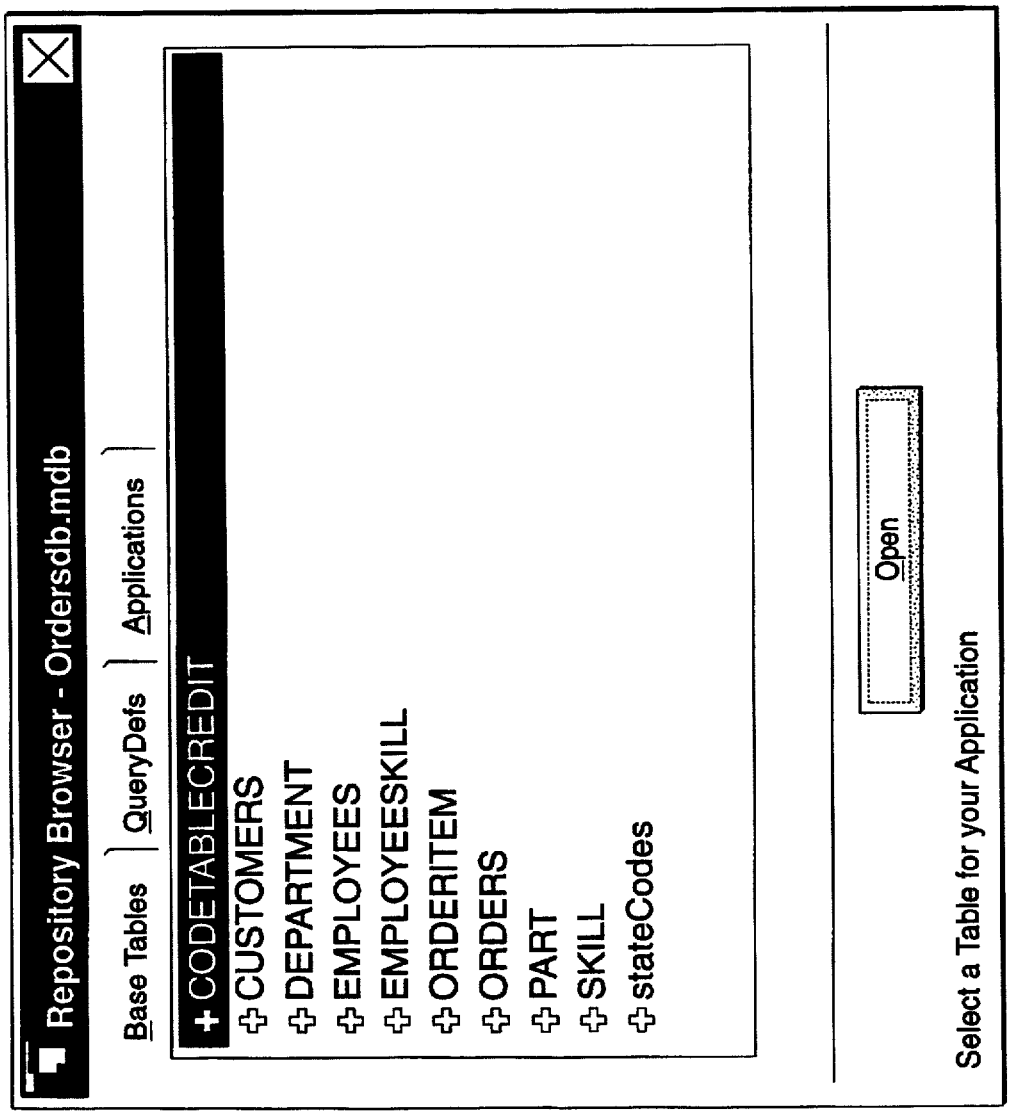
FIG._2

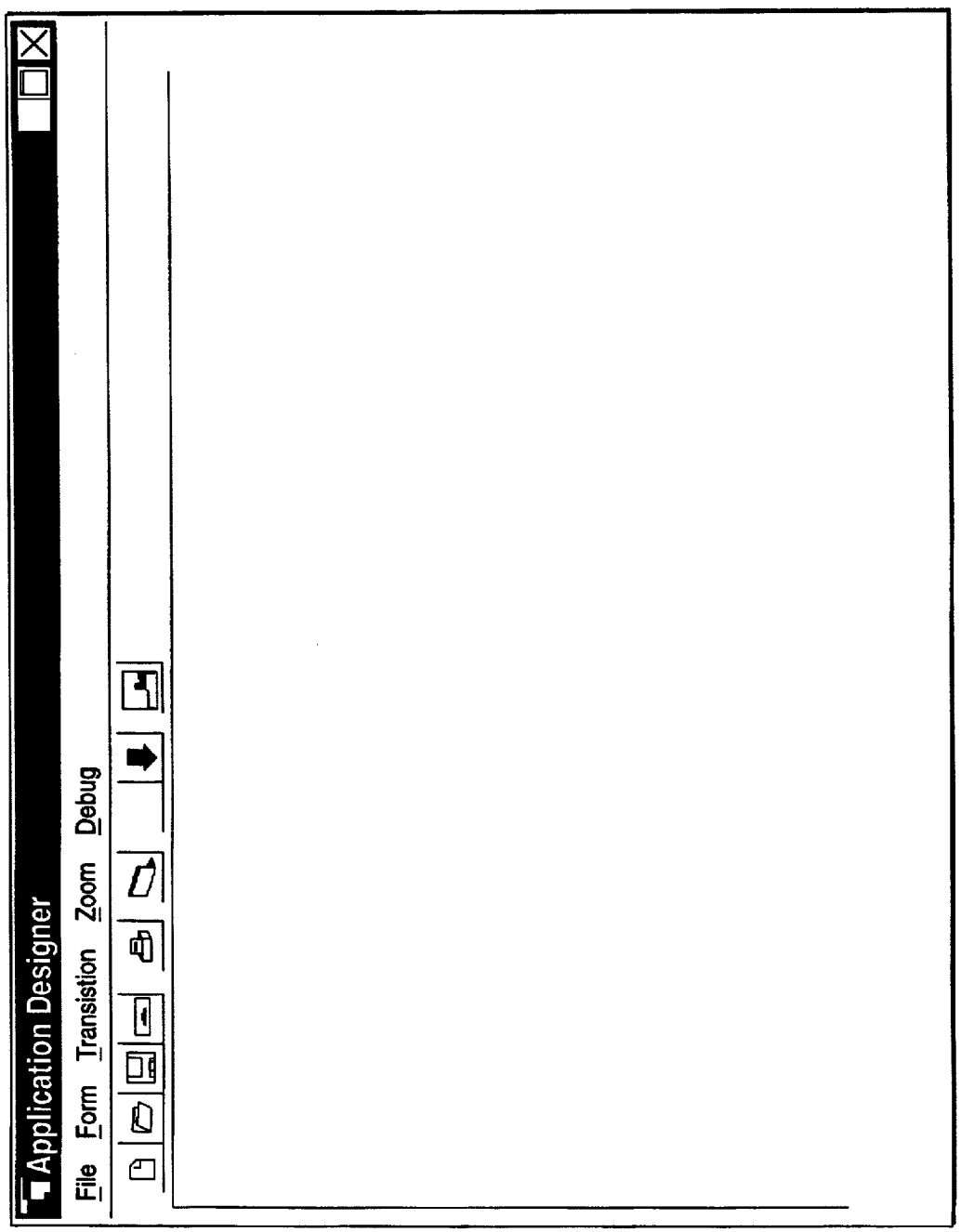
FIG._3

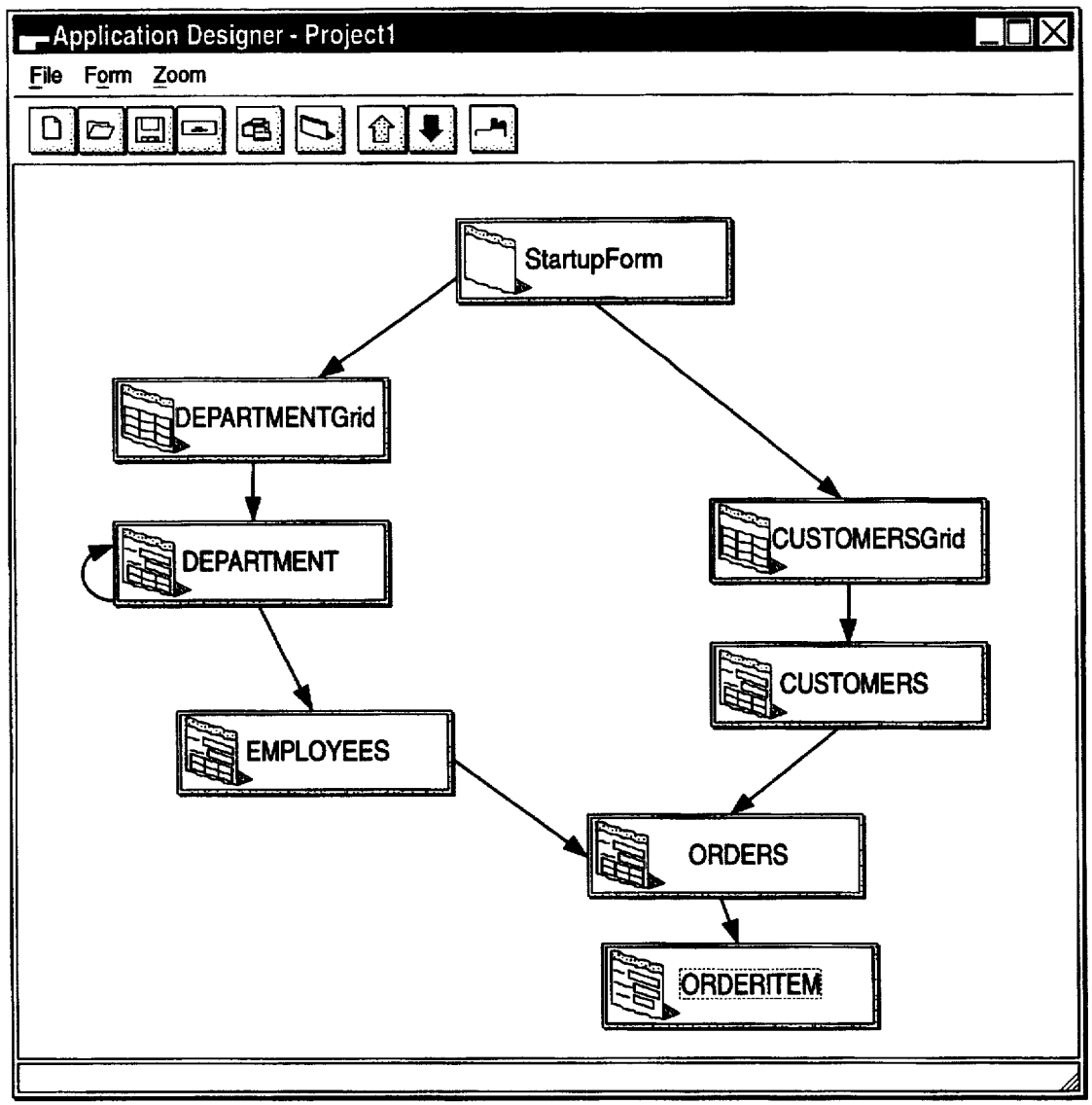
FIG._4

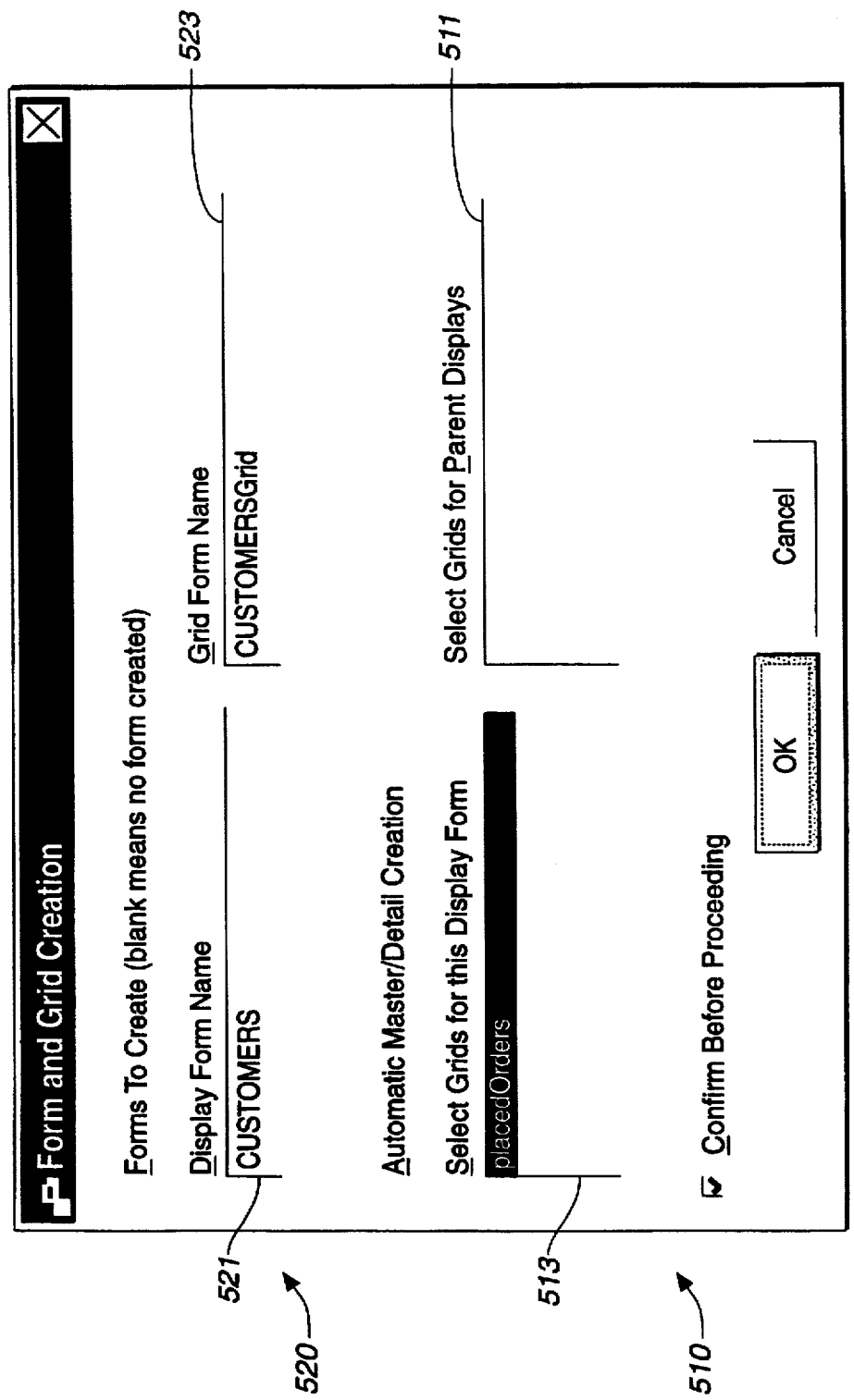
FIG._5

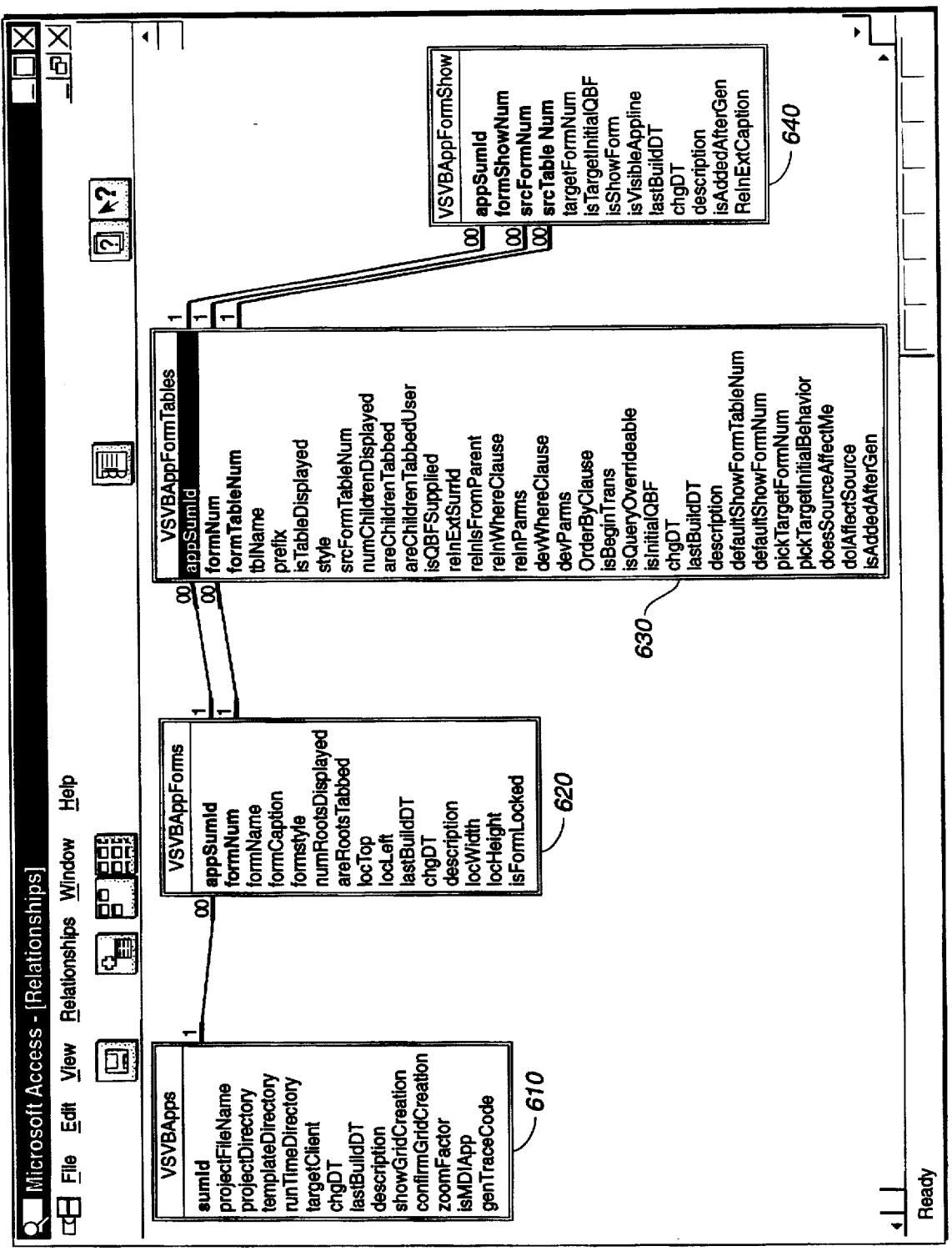
FIG._6

Form - CUSTOMERS

Form Properties

Form Name
|CUSTOMERS|

Form Caption
|Customer|

Form Description

☐ Form is locked

| CUSTOMERS |
| ORDERS(placedOrders) |
| ☐ ORDERS |
| UnpaidORDERS(placed) |
| ☐ ORDERS |

Independent RecordSource(RS) Properties

☐

☐ QBF Enabled

Style
|Display ▸|

Prefix For Controls
|T1|

Description

Create QueryDef

Add Form
Show

Selection Criterion
☑ Overrideable by End User
Table / Query Name
|CUSTOMERS|

Additional Where Clause

Order By

Join With Parent RecordSource

*FIG._7*

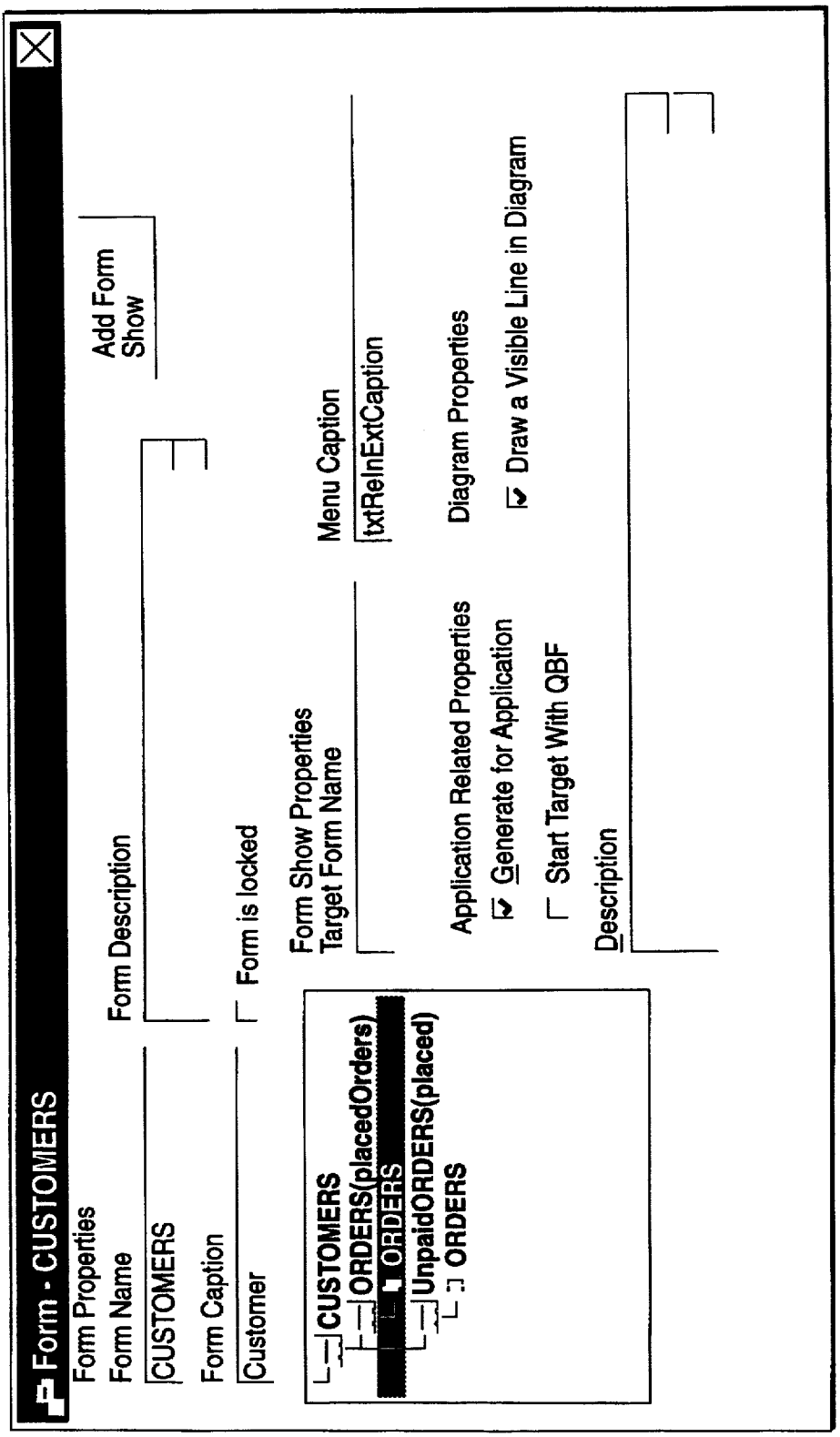
FIG._8

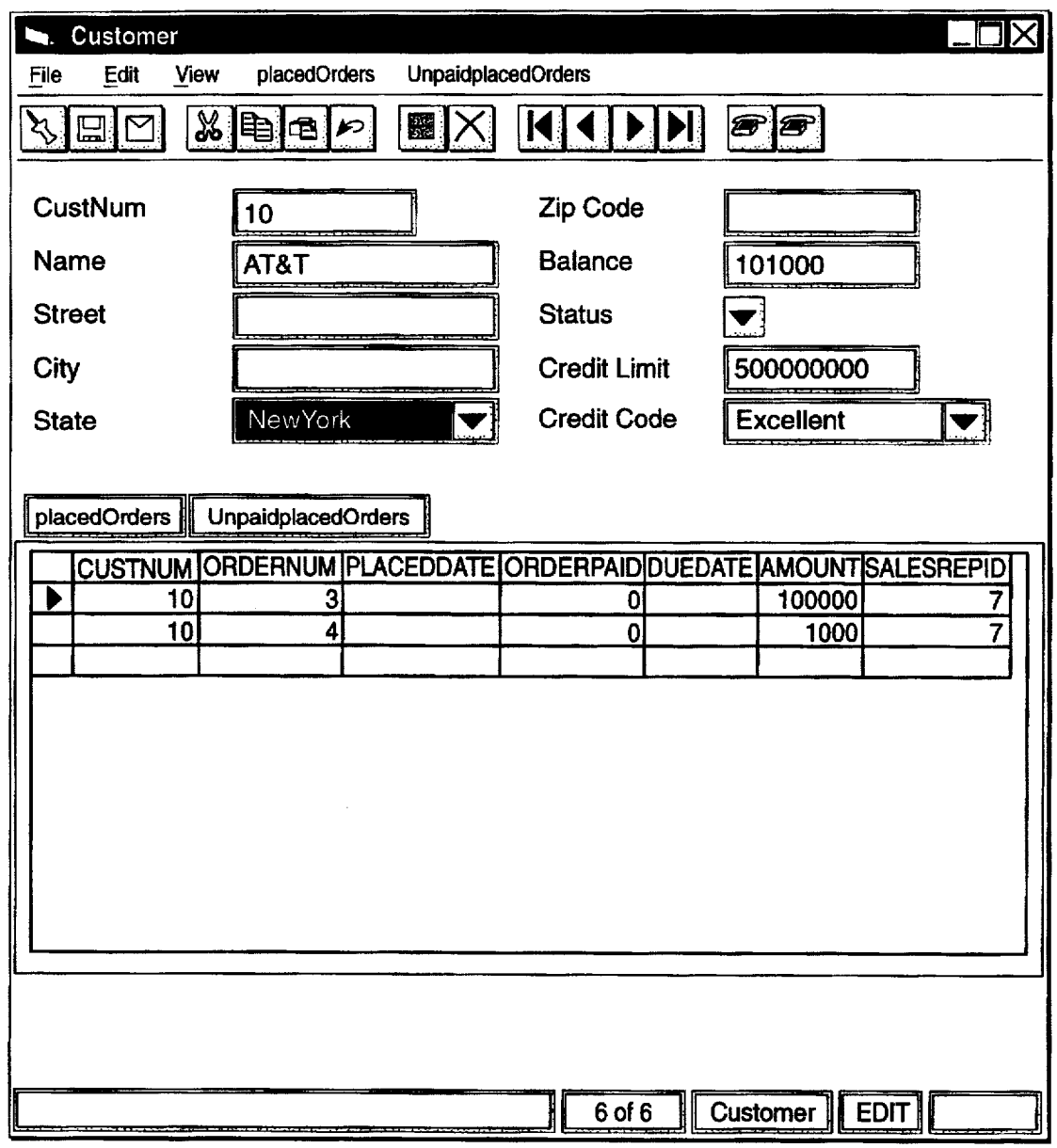
FIG._9

AUTOMATED CLIENT/SERVER DEVELOPMENT TOOL USING DRAG-AND-DROP METAPHOR

BACKGROUND OF THE INVENTION

The present invention relates to software development tools for developing client/server software, particularly multiple-table database applications for client/server environments.

The development of multiple-table database applications for client/server environments has been a laborious, time-consuming task requiring a high level of expertise. Such applications are custom-developed to the specifications of a particular customer. Hence, unlike the development of shrink-wrapped software which may also require a high level of programming expertise, the development of multiple-table database applications for client/server environments requires in addition expertise in the business of the customer.

Capturing the requirements of the application is in itself a complex task, involving significant analysis and design. When the resulting specification is approved, then the work of actual programming begins. Once coding has proceeded to a significant degree, it becomes extremely difficult to makes changes to the application. This approach to client/server development may therefore be termed "the waterfall approach"—once development has proceeded beyond a certain point ("the waterfall"), it is difficult or impossible to go back or change course.

What is needed, therefore, is a tool for the development of multiple-table database applications for client/server environments that simplifies both capture of system requirements and code production in a way that greatly reduces the time, cost and expertise required to develop complex client/server applications. The present invention addresses this need.

SUMMARY OF THE INVENTION

The present invention, generally speaking, provides a tool for the development of multiple-table database applications for client/server environments that automates both capture of system requirements and code production. In accordance with one embodiment of the invention, a client portion of a multiple-table, client/server database application for processing requests against a server database, is developed by first storing in a repository a description of the server database describing database entities within the server database and relationships between those database entities. Representations of the database entities are displayed, and an application drawing window is provided. The user drags and drops within the application drawing window one of the representations that represents a particular database entity. The tool then creates within the repository an entry for the particular database entity, and draws within the drawing window a representation of the particular database entity, e.g., a form to be generated. For each database entity for which an entry within the repository has been created, the tool checks the description of the server database stored in the repository to determine whether a relationship exists between the particular database entity and the database entity being checked. If a relationship does exist, the tool then creates within the repository an entry for that relationship, and draws within the drawing window a connector representing the same. Each connector may represent a Form Transition, for example. The foregoing drag-and-drop sequence is repeated multiple times. When the design is complete, the tool, using information stored in the repository, automatically generates the client portion of the multiple-table, client/server database application. Within the client portion of the multiple-table, client/server database application, when data from a particular database entity is displayed, if a user inputs a specified command, data from a related database entity is displayed. Further features of the invention include automatic Master/Detail construction and automatic multi-form synchronization.

BRIEF DESCRIPTION OF THE DRAWING

The present invention may be further understood from the following description in conjunction with the appended drawing. In the drawing:

FIG. 1 is a diagram illustrating the overall process of developing a database application using the present tool;

FIG. 2 is a screen display of a repository browser window used to quickly locate database entities to be used in designing the database application;

FIG. 3 is a screen display of an application designer window into which database entities from the repository browser are dragged and dropped;

FIG. 4 is a screen display of the application designer window following the drag-and-drop design process;

FIG. 5 is a screen display showing a Form and Grid Creation dialog in response to which the user confirms or disconfirms design actions of the tool taken in response to the user's drag-and-drop manipulation of database entities;

FIG. 6 is an entity-relationship diagram of the database used to capture information about the design of the database application;

FIG. 7 is a screen display showing a Recordsource Form Properties sheet displaying the contents of a node within the application drawing window of FIG. 4 and from which the Recordsources of the form and their status as dependent or independent may be observed;

FIG. 8 is a screen display showing a Form Transition Properties sheet used to edit the properties for a Form Transition; and FIG. 9 is screen display showing a Master/Detail form in a multiple-table database application.

DETAILED DESCRIPTION OF THE PREFERRED EMBODIMENTS

The following description describes various innovative features of a tool for the development of multiple-table database applications for client/server environments. The development tool is commercially available from the present assignee under the trade name Vision Builder™. In the following description, the various terms are used in accordance with definitions as follows:

Application generator: a Vision Builder tool that uses repository information to automate generating complete, executable multiple-form applications without requiring any 4GL coding.

Child table: a table from the "many" side of a one-to-many relationship.

Data model: a description of a database in terms of tables, columns (lengths and types), primary keys and foreign keys, relationships, and QueryDefs. A one-to-many relationship is defined using a primary key from the one ("parent") side, plus a foreign key from the many ("child") side.

Display form: a form table style that uses GUI fields and/or controls such as text boxes, check boxes, combo boxes and so on (in contrast with a grid style that presents data in a spreadsheet-like style of rows and columns). When a display form also presents related child data within a grid on the same form, it is referred to as a Master/Detail.

Form Transition: a property that allows a Recordsource to feed the Root Recordsource of another form, as well as to show that other form.

Form: a window designed to play a specific role in a program's visual interface.

Form table: represents the information necessary to generate a Recordsource used to see related data, either on the same form or some target form.

Grid form: a form that displays information in row/column format. A Grid form shows a set of database records in a spreadsheet-like format (many records with little detail about each). The user can choose one of the records to access a display form with information about that selected record.

Master/Detail: a form style that presents table data in a master GUI display and data from child rows in a grid embedded on the same form. Typically the master and detail's aspects are dynamically linked such that changing to a different master record summons the applicable child detail.

Parent: a table from the "one" side of a one-to-many relationship.

Pick: a Vision Builder operation that allows users to select information from one form and copy it into foreign key fields on another form.

Query By Forms (QBF): in Vision Builder, a Query Specification form on which users enter search criteria to retrieve specific information from database tables.

QueryDef: a named SQL query of joins and projections of Base Tables and/or other QueryDefs created by the user and stored in the database. A QueryDef object makes it convenient to test and store information needed to create recordsets that are used often.

Recordsource: a collection of records selected from a query or table and presented on a form. A Root (or Master) Recordsource is always displayed and is populated by another form when this form is part of a Form Transition. An Independent Recordsource does not depend on any other Recordsources in the form for its records. A Dependent Recordsource depends on other Recordsources in the form and has a property called "srcFormTableNum" that refers to another Recordsource on this form. In particular, when a new row becomes current in the source Recordsource, the system issues a SQL query to retrieve the related rows in each Dependent Recordsource. This SQL query is constructed using the key fields from the source Recordsource as selection values to corresponding columns in the Dependent Recordsource. The corresponding columns are typically derived from a relationship between the tables.

Relationship: a superset of relationships defined between Base Tables by the application developer and relationships involving QueryDefs, which are computed by the system.

Repository: a database file such as a .MDB file that contains all of the data definitions for Base Tables, QueryDefs and applications.

Root table: a table on a form that controls or synchronizes record display and updates behavior of other, related tables on the form.

Start-up form: in Vision Builder, a form that is created from definitions on the Application Designer and Form Property sheets. When an application is built, a start-up form is automatically created with menu items and toolbar buttons to access forms that were dropped on the diagram (and their underlying database tables).

Surrogate ID (surrid): in Vision Builder, a unique identifier for every object in Vision Builder applications that allows the system to keep client and server components synchronized.

Table: a superset of Base Tables and QueryDefs. Base Tables and QueryDefs share a Name Space; i.e., each table name is unique.

Template: a pre-built application component consisting of both graphical controls (such as combo boxes and radio buttons) and code governing form/control behavior. When a client application is generated, Vision Builder templates, or user-customized templates, are included.

Transition: the "call" relationship between the tables represented by forms on the application diagram; by default, the arrow points to the "many" or "child" table in a one-to-many or parent/child relationship. Curved arrows with the same beginning and end point represent self-relationships.

Trigger: a mechanism for associating an insert, update, or delete statement on the database server with the server code that executes in response to that server event; triggers are executed by the database when specific types of data manipulation commands (insert, update, delete) are performed on specific tables.

Broadly speaking, the development of multiple-table database applications for client/server environments may be divided into two phases. During a capture phase, the development tool captures information concerning the design of the application as the user "draws" the application in a drawing area using drag-and-drop techniques. During a subsequent generation phase, the development tool generates client and server code to realize the application.

The application runs against a database server, such as Oracle 7, for example, or any of a number of ODBC (Open Database Connectivity)-compliant database servers, such as Sybase, Informix, etc.

The generation of database server code is known in the prior art. Essentially, the user specifies declarative business rules describing the fundamental server-side behavior of the system. The development tool generates corresponding database trigger code for the database server. Since this aspect of client/server automation is known, it will not be further described.

The present development tool achieves significant advances in the generation of client code, described herein in detail. The target language for the client code is preferably a forms-based, 4GL language such as Visual Basic, Powerbuilder, SQL for Windows, etc. Hence, from the application design information captured during the capture phase, the development tool during the generation phase generates a set of forms together with 4GL code that controls the behavior of those forms. An overview of the development process using the present development tool is shown in FIG. 1. Referring to FIG. 1, in order to generate a multi-form application to run against a database server 100, a local database, or repository 110, is created. Within the repository, a data model 111 of the server database is created. To this data model is added additional "layers" of information, including business rules 113 (touched upon previously) and application definition information 115. The application definition information 115 is captured as the user draws the application within an application drawing area 120 (displayed on a computer screen, not shown) using drag-and-drop techniques.

The application definition information 115 may itself be in the logical form of a database. In a preferred embodiment, an application is described as a collection of table rows related in one-to-many fashion. An application describes a multi-form program and is represented by a table row within a table VSVBApps 116. ("VSVB" stands for "Vision Software Vision Builder.") A database may contain several applications, each of which is represented by an application drawing (120). An application may contain many forms, each of which is described by a single row within a table VSVBAppForms 117. A form may contain multiple tables, each of which is described by a table row within a table VSVBAppFormTbls 118. Finally, each table may respond to user input to cause a transition to another form. Each transition is described by a table row within a table VSVBAppFormShows 119.

The present development tool may be built upon and leverage the capabilities of existing popular software packages. In an exemplary embodiment, Microsoft Access is used as the repository. Microsoft Access is a relational database management system that is part of the Microsoft Office Pro application suite. Also in an exemplary embodiment, the multiple-table database application is generated in Microsoft Visual Basic; i.e., the application is a Visual Basic project. As described previously, Visual Basic is a 4GL, forms-based programming language. Of course, other database management systems and other target 4GL programming languages may be used.

An application in Visual Basic typically contains two types of code: form-specific code and generic code. Code that pertains to a particular form is form-specific code and, in Visual Basic, is stored as part of that form. Other code (stored as "modules") is more general in nature. In the case of the present tool, this includes, for example generic code that, when a row becomes current, synchronizes each Dependent Recordsource (i.e., opens Dependent Recordsources using parameter values from the source Recordsource). Referring still to FIG. 1, the generic code constitutes a run-time library 130 that is "included" as part of the final application. The form-specific code is generated by application generation code 140 from templates, pre-built application components consisting of both graphical controls and code governing form/control behavior. The result is a set of forms and 4GL code realizing the desired client application.

Because no manual coding is required, the application can be easily modified, repeatedly if necessary, and regenerated. The "coding waterfall" problem characteristic of the prior art is thus avoided.

In general, using the present development tool, development proceeds in accordance with an iterative development cycle that may be loosely divided into three cycles: application design, business rules definition and customization. In the application design cycle (particularly the subject of the present description), the developer and the customer design the application by drag-and-drop and implement the application using templates. In the business rules definition cycle, the developer and the customer design and implement the application's business logic. During the customization cycle, the developer and the customer customize the application's appearance, behavior and business logic if needed. Development steps in accordance with the present development tool contrast sharply with development steps in accordance with prior art methodologies, as shown in the following Table 1:

TABLE 1

| TRADITIONAL DEVELOPMENT STEPS | PRESENT DEVELOPMENT TOOL STEPS |
|---|---|
| Talk to customer and gather data model information. | Talk to customer and gather data model information. |
| Go away. Design the data model and develop the application forms. | Go away and build data model or import the customers existing data model from MS Access or their DBMS. |
| Review forms with customer and explain how the forms will interact. Receive feedback. | Meet with customer and generate application. Review forms, form flow, and data entry procedures. Make changes with dialogs and regenerate the application until customer is satisfied. |
| Go away. Make any required form changes. Write the form flow code and application logic. | Gather business requirements. |
| Review application with customer and explain the database procedures and how the interface will work. Receive feedback. | Go away and implement business rules by filling out dialogs. Test deploy the application data mode and business rules to the database server. |
| Go away. Make the required changes to the code. Write business logic code. | Review application with customer. Make changes and regenerate the application as needed until your customer's requirements are met. |
| Review application with customer and show data entry procedures. Receive feedback. | Go away and make final customization. |
| Go away. Make required changes to the code. Review with customer. (This step may be repeated several times.) | Get customer approval and deliver to customer. |
| Get approval. At this point, many developers must rewrite the whole application to ensure scalability and client/server performance. Deliver to customer. | |

The first step in developing a client/server database application using the present tool is to produce a data model of the target database. In a preferred embodiment, the data model takes the form of a database within a database management system such as Microsoft Access. The data model may be obtained in various ways. It may be entered directly into the database management system, or the target database may be converted into a database within the database management system. Also, CASE (Computer-Aided Software Engineering) tools may be used produce a data model which may then be imported into the database management system. The data model is composed of Base Tables, query definitions, or QueryDefs, etc. The data model becomes the basis for the repository, i.e., the database 110 of FIG. 1 that is used to capture and store all of the required information to generate the database application.

Once the data model has been created within the database management system, the user may begin designing the database application. To do so, the data model is opened so as to enable the various entities within the data model to be viewed within a GUI (Graphical User Interface) window. In a preferred embodiment, the tool provides a "repository browser" (FIG. 2) that enables database entities within the data model (Base Tables, QueryDefs, etc.) to be quickly and easily located. An application drawing window is also opened, as shown in FIG. 3. The user then drags and drops database tables (as defined above) onto the design area of the application drawing window.

As the user drags and drops database tables into the application drawing window, the tool, based on the entity relationships stored in the data model, makes intelligent inferences about the user's intentions and forms relationships between the database tables and illustrates them within the application drawing window (FIG. 4). As these relationships are formed, the user may be asked to confirm or discontirm, using a Form and Grid Creation dialog (FIG. 5). Or the user, having become experienced with the tool, may select to have the tool proceed without presenting the dialog.

As design of the application proceeds, information concerning the database tables in the application design window and the relationships between them is stored in the repository in the form of a database, the structure of which is shown in FIG. 6. A row is created within a VSVBApps table 610 for each separate application drawing, the row having the columns shown underneath the caption VSVBApps in FIG. 6. Each application may have multiple forms. For each form in the application, a row is created within a VSVBAppForms table 620, the row having the columns shown underneath the caption VSVBAppForms in FIG. 6. Each form in the application may display data from multiple tables, in "Master/Detail" format, for example, as shown in FIG. 9. The tables are the actual source of data within the application, while the forms each function as a "shell" to display the data. For each table, or Recordsource, in the application, a row is created within a VSVBAppFormTables table 630, the row having the columns shown underneath the caption VSVBAppFormTables in FIG. 6. Finally, for each table used to populate a form with data, different selections by a user of different data fields may result in different forms being called up and shown. That is, each table may have multiple Form Transitions (as that term is defined, consistent with its use within the Visual Basic programming language) or the equivalent. For each Form Transition in the application, a row is created within a VSVBAppFormShows table 640, the row having the columns shown underneath the caption VSVBAppFormShows in FIG. 6.

Notice that, beginning on the left-hand side of FIG. 6 with the VSVBApps table, each table bears a "one-to-many" relationship with the next table to the right, this one-to-many relationship being denoted by "1" on the one side (parent side) of the relationship and by "∞" on the many side (child side) of the relationship. The primary key of the VSVBApps table, surrid for "surrogate ID," is added to the VSVBAppForms table as a foreign key, relating each form back to the application in which it appears. The primary key of the VSVBAppForms table is surrid and formNum. Both surrid and formNum are required to uniquely identify a form. Each succeeding table has as foreign keys the foreign keys and primary key of the preceding table, and has its own primary key, all of these keys being required to uniquely identify a particular row within that table.

Given an application, i.e., a row within the VSVBApps table identified by a unique surrid, it is a trivial exercise to find all the forms that belong to that application. Say, for example, that surrid=27. A simple database operation may be used to search the forms table, VSVBAppForms, to find all the forms that have surrid=27.

Many of the particular columns within the rows shown in FIG. 6 are not important to an understanding of the present invention and therefore are not described in detail. Brief descriptions of the fields are included as Appendix I. Of particular interest, however, are the "reln" (relationship) columns within the VSVBAppFormTables table— relnExtSurrid, relnIsFromParent, relnWhereClause, and relnParms. The field relllsFromParent denotes the direction of the relationship, either from parent (e.g., from Department to sub-departments) or from child (e.g., from Department to super-department).

Whereas it is a simple matter, given an application, to find its forms, a more subtle problem is to determine what data should be used to populate a particular form. In other words, the system must be able to determine from what form table another form table gets its parameters in constructing a SQL query to retrieve data for that Recordsource, and which fields are those parameters. To take a simple example of a database having a CUSTOMER table that transitions to an ORDERS table, when a new customer is added and the transition to ORDERS is executed, the system must know to display the orders of the new customer, not the orders of the customer displayed previously. The "reln" columns store the information necessary to ensure proper synchronization of this type between forms.

In other words, within a particular form, a Dependent Recordsource, or form table, must know the Recordsource (dependent or independent) from which it depends.

At Definition Time, doubling clicking on a form within the application drawing window causes the form's Form Properties sheet (FIG. 7) to be displayed, from which one may observe whether a Recordsource, or form table, is dependent or independent. In FIG. 7, it may be seen that CUSTOMERS is an Independent Recordsource (i.e., appears at the top of the hierarchy for the form), and that ORDERS depends on CUSTOMERS. In FIG. 6 therefore, within the row of VSVBAppFormTables corresponding to ORDERS, the field srcFormTableNum with have a value that refers to CUSTOMERS (i.e., "1"—the first Recordsource in this form).

The knowledge that ORDERS depends on CUSTOMERS, however, is not by itself sufficient to populate ORDERS with the correct data. The system must also know which fields within CUSTOMERS and ORDERS are matching. In technical terms, relnExtSurrid identifies the relationship of the base table or (QueryDef) between the driving and the driven data controls in the repository and is used to compute the relnWhereClause. The relnWhereClause (which supports multiple keys) identifies the join between the primary and foreign keys for the relationship, and relnParms lists the parameters and their data types for the one side of the relnWhereClause that is a parameter. For example, in the case of CUSTOMERS and ORDERS, assuming CName is the primary key in CUSTOMERS and CustName is the corresponding foreign key in ORDERS then, for the ORDERS Recordsource, the relnWhereClause is "CustName=[?Cname]"; the relnParms are "[?Customer ID]". At runtime, a SQL query is created by substituting the current value of the source Recordsource (CUSTOMER) into the Dependent Recordsource's parameter using a column name the same as that specified in the relnParms. The SQL query is prefaced by "select * from". The source Recordsource is indicated by srcFromTblNum.

For example, at runtime, suppose the user positioned to a new customer "ACME". The relnWhere and relnParms values are used, along with the Customer row value, to construct this SQL query:

select * from ORDERS where CustName="ACME".

Resulting rows are displayed in the ORDERS grid on the form.

Note that the database table to be queried is given in VSVBAppFormTables (FIG. 6) by the field tblName, and the foreign key query value is given by the primary key value of the row srcFormTableNum.

The foregoing notion is fundamental and is propagated throughout the generated application such that Dependent Recordsources remain in sync with the Recordsources from which they depend. Furthermore, although the case of a single Dependent Recordsource has been described, a Recordsource may have multiple Dependent Recordsources, some are all of which may have their own Dependent Recordsources, etc. For example, ORDERS may depend from CUSTOMERS and ITEMS may depend from ORDERS, and PAYMENTS may depend again from CUSTOMERS, etc., in nested fashion.

A similar principle of operation applies to Form Transitions, each of which is represented by a row in the VSVBAppFormShows table in FIG. 6. At runtime, a Form Transition is activated from one form (by double clicking, menu selection, etc.) so as to launch yet another form. Form Transitions are represented in the application drawing window as arrows. At Definition Time, doubling clicking on an arrow within the application drawing window causes the Form Transition Properties sheet (FIG. 8) to be displayed. Again, the indentation of a Form Transition underneath another form indicates that the Form Transition will obtain its data from that form. In FIG. 8, it may be seen that the Form Transition ORDERS is indented underneath the Dependent Recordsource ORDERS(placedOrders). Therefore, when the Form Transition ORDERS is executed, the table ORDERS(placedOrders) will be used to populate the form. In others words, the user picks an order from the table ORDERS(placedOrders) and the Form Transition ORDERS is then started with that order. In Visual Basic terms, a reference to the RecordSet driving the CUSTOMER.ORDERS grid is placed in the ORDERS Data Control to drive ORDER Scalar fields.

From the foregoing discussion, it will be appreciated that an important feature of the present tool is the ability to build multiple-table forms with nested Recordsources, which are themselves inferred and built on the basis of database relationships stored in the repository. The tables illustrated in FIG. 6 contain all of the information required to generate the final application. Equally important, however, is the manner in which the data in FIG. 6 is captured from user manipulation of database entities, i.e., from the user drawing the application. The tool must be provided with certain intelligence in order to determine whether, based on the particular manipulations observed, the user wants to create a Master/Detail display, etc.

Referring again to FIG. 5, the tool's inferences about the user's intent based on the user's manipulation of database entities is normally presented to the user in the Form and Grid Creation dialog. Consider first the frame 510 within the dialog, Automatic Master/Detail Creation. Master/Detail creation pertains to parent/child relationships stored within the repository. In the case of CUSTOMERS and ORDERS, for example, CUSTOMERS is the parent and ORDERS is the child. When the user first drags and drops CUSTOMERS and then drags and drops ORDERS, the tool infers that the user wants to create a Master/Detail form on which displaying a customer causes a list of that customer's order to also be displayed.

To accomplish this result, when a database entity is dropped, the system, prior to displaying the Form and Grid Creation dialog of FIG. 5, first "looks around" at the other entities that have already been dropped to see if there are any forms for which a parent of the database entity being dropped is the Root Recordsource, i.e., is at the top of the form hierarchy. If so, then the "child" table (e.g., ORDERS) "finds" its parent table (e.g., CUSTOMERS), and is added within the database of FIG. 4 as a grid on the form of the parent table(s). The parent tables are listed within the Select Grids for Parent Displays box 511 in FIG. 5. In the example of CUSTOMERS and ORDERS, an entry such as CUSTOMERS.ORDERSGrid would be listed here, indicating that an order grid has been added to the customer display.

Although the foregoing example has been found in practice to be the most common, it may also happen that the user, instead of dragging and dropping first CUSTOMERS and then ORDERS, might instead drag and drop them in the reverse order, first ORDERS and then CUSTOMERS. The same result is desired, however, namely that an order grid be added to the customer display. Therefore, in similar manner as previously described, the newly-dragged parent finds its already existing children, if any, and the appropriate Master/Detail display is created. In the example of ORDERS and CUSTOMERS, the entry CUSTOMERS.ORDERSGrid would be listed in the Select Grids for this Display Form box 513 in FIG. 5, indicating that an order grid has been added to the customer display.

Consider the further example in which a dragged table is both a parent and a child to tables already serving as Root Recordsources per prior drops. For example, DEPARTMENTS may have EMPLOYEES which have ORDERS. DEPARTMENTS and EMPLOYEES are related as parent/child, and EMPLOYEES and ORDERS are related as parent/child. DEPARTMENT and ORDERS might be dragged and dropped in that order, which would not result in the creation of any Master/Detail, since DEPARTMENT and ORDERS are not directly related. If EMPLOYEES is then dragged and dropped, however, the result is to create two Master/Detail displays, an EMPLOYEES detail on DEPARTMENTS and an ORDERS detail on EMPLOYEES. Therefore, within the box 513 in FIG. 5, EMPLOYEES.ORDERSGrid would be displayed, and within the box 511 in FIG. 5, DEPARTMENTS.EMPLOYEESGrid would be displayed.

The foregoing discussion has focussed on Master/Detail creation, a crucial part of automating multiple-table application development. A related issue, to be addressed presently, is which forms to create (as nodes in the application diagram), as represented within the display areas 521 and 523 in FIG. 5. Of course, not all tables are part of a Master/Detail relationship. Referring still to FIG. 5, when a table is dragged and dropped, a "freestanding" form containing that table will usually be created. Hence, referring to the frame 520, dragging and dropping CUSTOMERS causes CUSTOMERS to be displayed within the box 521. Furthermore, if the table that was dropped has no parents, a grid will also be created. Hence, CUSTOMERSGrid is displayed within the box 523 in FIG. 5. The underlying rationale is that, if a form is to be accessed directly as opposed to being accessed through another form, it will usually be accessed using Query By Forms (QBF). QBF may be enabled or disabled for each form. If enabled, then the Start-up form will include a QBF icon for that form. Executing the query will result in display of a scrollable grid (e.g., CUSTOMERSGrid) of customers meeting the specified criteria, from which the user may select a particular customer to be displayed (e.g., within the display form CUSTOMER).

If ORDERS is later dropped, since ORDERS is a child of CUSTOMER, a Master/Detail form is created. However, if ORDERS is dropped a second time, since a Master/Detail has already been created, a "freestanding" ORDERS Grid form is created, directly accessible through the Start-up form. If ORDERS is dropped yet a third time, then a separate freestanding instance of the ORDERS Grid form is created under another name, for example ORDERPurge. This manner of operation allows forms to be created that are based on existing forms but are for specialized transactions. The transaction-specific form is automatically "wired-into" the other forms in a number of different ways. In the case of ORDERPurge, for example, a transition would be created 1) from ORDER (freestanding) to ORDERPurge (so as to look at an order in a purge way), 2) from the ORDER detail of the CUSTOMER master, 3) directly from the Start-up form, and 4) also in the reverse direction from ORDERPurge to ORDER. These various transitions are reflected on the application drawing and on the property sheets of the various forms, and may be edited by the user. To draw an analogy, the system grows a tree (multiple transitions, including all transitions that the user is likely to want) and then affords the user the opportunity to prune the tree (remove unwanted transitions). The premise therefore is that most often the user will want a particular transition, making it easier to remove the transition in those instances where it is not wanted.

As may be appreciated from the foregoing description, the look of the application forms depends on the following conditions: the order in which the tables are dropped; where a table is dropped; and whether the table is related to other tables in the diagram. From the foregoing discussion, one of ordinary skill in the art will appreciate the manner in which, using the present development tool, multiple-table database applications may be created by dragging and dropping Base Tables within the application drawing window. Research has shown, however, that the vast majority of real-world applications are not built upon Base Tables at all, but are based upon QueryDefs and the like, affording the ability to perform database join operations, projections, etc. Whereas detecting relationships from the manipulation of Base Tables is relatively straightforward (given the data model stored in the repository) detecting relationship from the manipulation of QueryDefs is more complicated. In a preferred embodiment, relationships between QueryDefs are inferred in accordance with the following method:

1. Determine which tables and which columns within those tables participate in the QueryDefs.
2. Determine whether the columns identified in Step 1 include the key fields necessary for the relationship that the respective Base Tables participate in.
3. If the answer in Step 2 is yes, then the QueryDefs are caused to "inherit" the relationship from that base table.

For example, the user might drag and drop QueryDef1 (DEPARTMENT) followed by QueryDef2 (EMPLOYEES). The system discovers that QueryDef1 includes DEPARTMENT, in particular the Department# field. The system further discovers that QueryDef2 includes EMPLOYEES, and also includes a field corresponding to Department#, say, "myDepartment#." Hence each QueryDef can uphold its half of the underlying relationship between DEPARTMENT and EMPLOYEES. This relationship therefore exists between QueryDef1 and QueryDef2.

When the user has defined the application to his or her satisfaction by dragging and dropping tables, QueryDefs, etc., and by modifying their properties as indicated on the accompanying property sheets, the user may then request the system to generate the application.

The client-side application will consist of forms, including graphical elements and code pertaining to those graphical elements, and free-standing code that is included in a run-time library and that is not specific to any particular form. The form-specific graphical elements include, for example, menus, toolbars, captions fields, text fields, combo boxes, grids, tab groups, etc. Form-specific code handles events that make the application run, and includes data controls—program constructs that form the link between the target database and the form. Form-specific code is generated from templates, or code modules, that are connected together during generation according to the information stored in the repository, particularly as reflected in FIG. 6, so as to realize the various required forms. A process known as "macro expansion" is performed with respect to the templates (more precisely, copies of the templates) that adapts the templates for a particular use with particular named entities.

The main application generation routine proceeds in accordance with the following psuedocode routine:

For each Form
  For each Recordsource
    generate data control;
      if Display style from TblDef read in fields and
        generate caption/text box or combo box onto
        Form and event code to perform processing;
      else if Grid style generate Grid;
      for each Dependent Recordsource of this
        Recordsource, generate code in reposition event to
        close/re-open queries of Dependent Recordsources;
  write to disk;
next...

With respect to Dependent Recordsources, an example of code generated to close/re-open queries is code to, when a new customer is viewed, obtain that customer's orders and payments.

A list of the available templates in a preferred embodiment of the invention is provided as Appendix II. In general, for each style of form table (e.g., grid, display), a template is provided for each kind of GUI control, for fields within the form table, etc. Executable code is separated from graphics templates to facilitate code reuse. A list of the routines in the run-time library is provided as Appendix III.

It will be appreciated by those or ordinary skill in the art that the invention can be embodied in other specific forms without departing from the spirit or essential character thereof. The foregoing description is therefore considered in all respects to be illustrative and not restrictive. The scope of the invention is indicated by the appended claims, and all changes which come within the meaning and range of equivalents thereof are intended to be embraced therein.

APPENDIX I

| Field | Data Type | Description |
|---|---|---|
| | | VSVBApp |
| surrid | Text | Surrid enables support of import apps between data-bases (without renumbering this row) |
| projectFileName | Text | The name of the project to create (name of .vbp file) |
| projectDirectory | Text | Directory for projectFileName |
| templateDirectory | Text | Issue: what directory? This is presumably the directory itself, relative to db |
| runTimeDirectory | Text | Where the generic vb code is located |
| targetClient | Text | any ('vb4')-later Powerbuilder etc. |
| chgDT | Date/Time | The last time this app was modified |
| lastBuildDT | Date/Time | when last build was run |
| description | Memo | |
| showGridCreation | Number | |
| confirmGridCreation | Number | |
| zoomFactor | Number | |
| isMDIApp | Yes/No | generate App as MDI |
| genTraceCode | Yes/No | |

APPENDIX I-continued

| Field | Data Type | Description |
|---|---|---|
| VSVBAppForms | | |
| appSurrid | Text | Foreign Key |
| formNum | Number | Starts at 1, supplied by client (vb/ab). By convention, the start form has number 1. |
| formName | Text | Unique in app. Calc by sys on drag; prefix is tblName; suffix is grid, qbf, ' ' (display). Is 'startform' for start form. Unalterable after built? |
| formCaption | Text | Defaults to caption of first table, with 'Grid' appended. Empty → formName |
| formstyle | Text | Example: Start, Grid, Detail, MasterDetail. Not user visible in R1. |
| numRootsDisplayed | Number | Calc by appSvcs |
| areRootsTabbed | Number | Children means formTables with srcFormTable = 0 |
| locTop | Number | Within diagram, table's top |
| locLeft | Number | |
| lastBuildDT | Date/Time | |
| chgDT | Date/Time | Only reflects change in style |
| description | Memo | |
| locWidth | Number | Width of form node |
| locHeight | Number | Height of form node |
| isFormLocked | Yes/No | New formTbls/Shows added (with isAddedAfterGen flag), but not genned |
| VSVBAppFormTables | | |
| appSurrid | Text | Foreign Key - app parent |
| formNum | number | Foreign Key - form parent |
| formTableNum | Number | Starts at 1 (root), supplied by client |
| tblName | Text | or qdefName - goes into data Recordsource |
| prefix | Text | field/table prefix to insure uniqueness of names in form. AppGen will remove spaces to insure valid syntactical name. |
| isTableDisplayed | Yes/No | If Table displayed there is no menu, otherwise there will be menu if FormShow is yes |
| style | Text | Grid, Detail, GridDetail (of same table) |
| srcFormTableNum | Number | Table that drives this (i.e., supplies qry parmValues; usually a reln. parent)- 0 if root |
| numChildrenDisplayed | Number | # formTables with src = me that are displayed; Calc by appSvcs |
| areChildrenTabbed | Yes/No | i.e., use a tab control. Followed even if just 1 child. |
| areChildrenTabbedUser | Yes/No | has user specified tabbed-ness (if so, don't default it) |
| isQBFSupplied | Yes/No | default = 11F(nodeNum = 1 & style = any('grid', 'dboutline'), true, false) |
| relnExtSurrid | Text | Via this reln (relnExt) |
| relnIsFromParent | Yes/No | Reln direction is from parent |
| relnWhereClause | Text | Calculated by system |
| relnParms | Text | Parameters for relnWhere. Format is parm1 datatype, parm2 datatype . . . |
| devWhereClause | Text | Additional Developer selection (e. g., 'paid' orders) |
| devParms | Text | Parameters for devWhere |
| OrderByClause | Text | Developer-specified order by |
| isBeginTrans | Yes/No | Starts/ends a transaction |
| isQueryOverrideable | Yes/No | Can Reln selection be overridden by QBF |
| isInitialQBF | Yes/No | When not target of Form Transition (not usually the case) |
| chgDT | Date/Time | |
| lastBuildDT | Date/Time | When line processed in last build. ALERT - we may need to save all the values used in the last build, so appFixup can use them. |
| description | Memo | Not processed - any notes the Developer wants to keep. |
| defaultShowFormTableNum | Number | formTable for primary showForm for this formTable |
| defaultShowFormNum | Number | showFormNum for primary showForm for this form Table |
| pickTarget FormNum | Number | Where to go for pick-parent. 0 → use <tblName> & "Grid" for just <tblName> if no grid. |
| pickTargetInitialBehavior | Text | any (browse, qbf) is qbf by default |
| doesSourceAffectMe | Yes/No | Does the source form table affect me? |
| doIAffectSource | Yes/No | Do I affect the source form table? |
| isAddedAfterGen | Yes/No | Defaults to no, set to yes during add-in, or for locked form |
| VSVBAppFormShows | | |
| appSurrid | Text | Foreign Key - app parent |
| formShowNum | Number | Starts at one |
| srcFormNum | Number | Foreign Key - where show starts (Form Number) |
| srcTable Num | Number | Foreign Key - where show starts (FormTable) |
| targetformNum | Number | Foreign Key - where line ends (form Number); assume target formTable is always #1 |
| isTargetInitialQBF | Yes/No | |
| isShowForm | Yes/No | The "no Thankyou" flag (e.g., Don't show OrderPurge from the Outstanding Orders table on the Customers/Orders form.) |
| isVisibleAppline | Yes/No | Set means I want appLine (for this formShow) visible on the application diagram (by default "down" is visible, "up" is invisible). |
| lastBuildDT | Date/Time | When last build processedthis formShow. |
| chgDT | Date/Time | |
| description | Memo | Not processed - any notes the Developer wants to keep. |
| isAddedAfterGen | Yes/No | Added during add-in, or for locked form |
| RelnExtCaption | Text | Caption generated for menu and toolbar for formshows |

APPENDIX II

Templates

AllShowFormButtonTemplate
AllShowFormMenuTemplatePopup
CodeTemplateAddButton
CodeTemplateAddUserEvent
CodeTemplateColCheckBox
CodeTemplateColComboBox
CodeTemplateColMaskedEdit
CodeTemplateColOLE
CodeTemplateColOptionButton
CodeTemplateColPicture
CodeTemplateColQuery
CodeTemplateColTextBox
CodeTemplateColTextBoxMemo
CodeTemplateDependentTable
CodeTemplateGrid
CodeTemplateInitCtl
CodeTemplateInitCtlDep
CodeTemplateInitialDisp

APPENDIX II-continued

Templates

CodeTemplateInitialDispDep
CodeTemplateMain
CodeTemplateMenuCommon
CodeTemplateResize
CodeTemplateShowForm
CodeTemplateShowFormButton
CodeTemplateShowFormSync
CodeTemplateShowFormToolbar
CodeTemplateShowFormToolBtn
CodeTemplateSSTab
CodeTemplateTableTabbed
ColumnTemplateCheckBox
ColumnTemplateComboBox
ColumnTemplateMaskedEdit
ColumnTemplateOLE
ColumnTemplateOptionButton
ColumnTemplatePicture
ColumnTemplateQuery
ColumnTemplateTextBox
ColumnTemplateTextBoxMemo
CommandButtonsTemplate
DataTemplate
DataTemplateGrid
DataTemplateNoDisplay
FormTemplateDependentTables
FormTemplateQuery
FormTemplateStartup
Imagelist
ImagelistTemplate
Lighton
MDIStartupForm
MenuTemplate
MenuTemplateExit
MenuTemplatePreferences
MenuTemplateQuery
mssccprj.scc
ShowFormMenuTemplate
ShowFormMenuTemplateSingle
TableGroupTemplateRight
TableGroupTemplateSiblingsNoTab
TableGroupTemplateTopTabbed
TableMenuTemplate
TableTemplateDisplay
TableTemplateGrid
TableTemplateGridDisplay
TableTemplateNoDisplayTable
TableTemplatesourceDependent
Template.vbp
ToolBarTemplate

APPENDIX III

The RUNTIME.BAS module contains all routines called by a Vision Builder-generated application. RUNTIME.BAS includes functions and subroutines that provide these services:
Initialization
Record Processing
Pick Processing, which allows users to copy a column value from a parent table to the current form
Error handling
User interface operations, including menu options and toolbar buttons
Utilities to check (and optionally modify) application statuses
A list of these routines follows.

UTILITY FUNCTIONS AND SUBROUTINES checkDatFocusChange
displayHelpMsg
displayMsg
endApp
findCodeTableName
getDevParms
getDevWhere
getFrmInstanceMeta

APPENDIX III-continued getInternalValuesFromCodeTable
getReInParms
getReInWhere
getStartForm
getStoredValuesFromCodeTable
isMDIapp
lastDatWithFocus
setCacheSize
setStatusPanel
showHelp
showInDebugWindow
completeAppInitialization
enableUserDefinedEvent
initGridColCtrls
initializeApp
initializeControls
initializeDatCtrl
initializeStartForm
registerObjNameAsSimilarTo
setDatCtrlMode
setStartForm

PICK FUNCTIONS AND SUBROUTINES processCmdPickClick
registerMyPickForm
setMenuPick
setUpdateInProgress
showPickBtn
unloadPickForm
updateParentFields

RECORD PROCESSING FUNCTIONS AND SUBROUTINES allowAddOnAllQDefParentTables
checkAllPendingChanges
copyAction
cutAction
decodeValues
deleteCurrent
deleteObjectAction
encodeValues
execUserDefinedEvent
insertObjectAction
pasteAction
pasteSpecialAction
pickOneNum
processCmdPickClick
processKeyDown
processMnuFirstClick
processMnuLastClick
processMnuNextClick
processMnuPreviousClick
registerDependency
repositionAction
retrieve
setDatCtrlMode
setRecordPositionMenu
setUpdateInProgress
syncAllTabDependents
syncRecordSet
syncTargetRecordSet
undoFieldChange
undoRecordChange
unregisterDependency
updateChanges
validateAction

USER INTERFACE FUNCTIONS AND SUBROUTINES addToolBtn
copyAction
cutAction
deleteObjectAction
disableEditMenu
enableUserDefinedEvent
getMyTargetForm
hideMe
insertObjectAction
pasteAction
pasteSpecialAction
pickOneNum

APPENDIX III-continued

```
processKeyDown
registerDependency
setDatCtrlMode
setEditMenu
setMenu
setMenuPick
setRecordStateMenu
setUpdateInProgress
setupQBFToolbar
setupStartupToolbar
setupToolbar
setWindowCaption
showQueryBtn
syncAllTabDependents
undoFieldChange
undoRecordChange
unregisterDependency
```

ERROR HANDLING FUNCTIONS AND SUBROUTINES

```
dataControlErrorAction
handleDBGridError
showDatabaseError
showError
```

What is claimed is:

1. A computer-implemented method of developing a client portion of a multiple-form, client/server database application for processing requests against a server database, the method comprising the steps of:

a) storing in a repository a description of the server database describing database entities within the server database and relationships between those database entities;

b) displaying representations of the database entities;

c) providing an application drawing window for GUI-based creation of a multiple-form client/server database application providing for form transitions between different ones of the multiple forms;

d) a user dragging and dropping within the application drawing window one of said representations that represents a particular database entity;

e) creating within the repository a form entry for the particular database entity, and drawing within the drawing window a representation of the particular database entity;

f) for each database entity for which a form entry within the repository has been created, checking the description of the server database stored in the repository to determine whether a relationship exists between the particular database entity dropped and the database entity being checked;

g) if a relationship does exist between the particular database entity and the database entity being checked, then creating within the repository a form transition entry for that relationship, and drawing within the drawing window a connector representing the form transition; and h) repeating step d) through step g) multiple times.

2. The method of claim 1, wherein the entry for a relationship provides for automatic Master/Detail creation and Form Transition generation.

3. The method of claim 2, wherein database entities are represented within the application drawing window as nodes having associated icons, and relationships are represented within the drawing window as lines joining various ones of the nodes.

4. The method of claim 1, comprising the further steps of:

i) using information stored in the repository, automatically generating the client portion of the multiple-table, client/server database application;

wherein, within the client portion of the multiple-table, client/server database application, when data from said particular database entity is displayed, if a user inputs a specified command, data from a related database entity is displayed.

5. The method of claim 4, wherein said particular database entity is a database table, and said entry within the repository for the particular database entity represents a form to be populated with data from the database table.

6. The method of claim 5, wherein data from the database table is used to populate multiple forms.

7. The method of claim 6, wherein the entry within the repository for said relationship represents a Form Transition programming construct.

8. The method of claim 7, wherein said form is referenced by multiple Form Transitions.

9. The method of claim 1, wherein the particular database entity is a query definition based on a non-empty set of database tables and specifying a non-empty set of fields selected from the non-empty set of database tables.

10. The method of claim 9, wherein step f) comprises, for each database table within the non-empty set of database tables, checking whether a relationship exists between the database entity being checked and the database table and, if a relationship does exist, determining one or more key fields within the database table required to support the relationship and further checking whether said one or more key fields are within said non-empty set of fields.

11. The method of claim 10, comprising the further step of, if said one or more key fields are within said non-empty set of fields, determining that a same type of relationship as was determined to exist between the database table and the database entity being checked exists between the query definition and the database entity being checked.

* * * * *